Nov. 29, 1955  W. M. POHL  2,725,134

TORQUE TRANSMITTING COUPLING

Filed April 26, 1954

INVENTOR:
Walter M. Pohl,
BY
Bair Freeman & McInnire
ATTORNEYS.

United States Patent Office 2,725,134
Patented Nov. 29, 1955

2,725,134

TORQUE TRANSMITTING COUPLING

Walter M. Pohl, Chicago, Ill., assignor to Foote Bros. Gear & Machine Corporation, Chicago, Ill., a corporation of Delaware Application April 26, 1954, Serial No. 425,426

3 Claims. (Cl. 192—105)

This invention relates to torque transmitting couplings and more particularly to speed responsive couplings for transmitting torque from a driving member to a driven member.

Speed responsive couplings are highly desirable for many types of uses to enable a driving electric motor or an internal combustion engine to achieve relatively efficient speed before it is connected to the load and to provide torque limiting protection. When used with electric motors couplings of this type enable a less expensive motor having a lower starting torque to be used and also reduce the high starting current demand. When used with internal combustion engines, such couplings enable the engine to start and to idle under no load conditions and pick up the load only at relatively efficient operating speeds.

Couplings of the type in which a friction band is driven through a connection to its leading end are particularly advantageous since their torque transmission characteristics are substantially independent of variations in coefficient of friction. The cost of such couplings has heretofore prohibited their use in many applications for which they would be advantageous such as, driving domestic washing machines, pumps, fans, and the like. It is therefore one of the objects of the present invention to provide a torque transmitting coupling which is extremely simple in design so that it can be manufactured at low cost and which operates efficiently as a speed responsive coupling.

Another object is to provide a coupling which is assembled from easily fabricated parts, the major ones of which may be of sheet metal and which therefore lends itself to low cost mass production methods.

Still another object is to provide a coupling in which the parts are self-supporting so that the need for external bearings is eliminated.

A further object is to provide a coupling in which the speed of engagement is controlled by springs which can easily be changed to change the speed characteristics and which also serve to hold the friction bands centered during its engagement to eliminate drag.

The above and other objects and advantages of the invention will be more readily apparent from the following description, when read with the accompanying drawing, in which.

Figure 1:
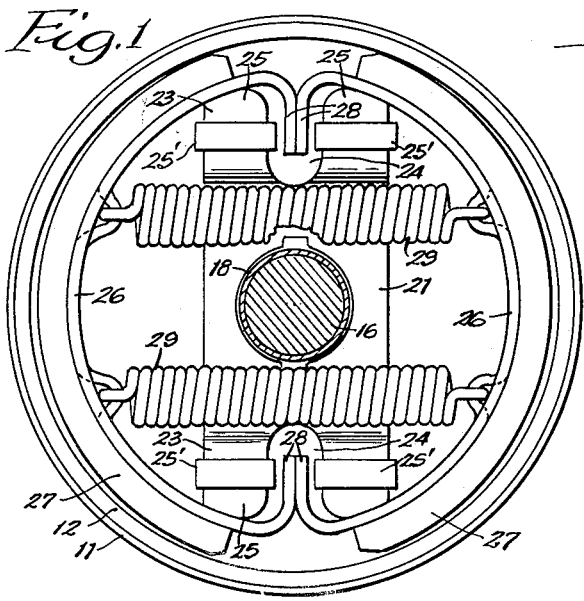
Figure 1 is an end view with parts broken away and in a section of a coupling embodying the invention.

The coupling, as shown, comprises a driven cup shaped element 10 which may conveniently be formed of sheet metal. The cup member 10 is preferably formed with a substantially flat end wall and a cylindrical side wall 11 which may be lined with friction wearing material shown at 12. The material 12 may be either a friction lining of the type commonly employed in brakes or, if preferred, may be a liner of metal, such as cast iron, in the form of a short sleeve fitted into and secured in the annular flange 11. The drum member is supported on a bearing 13 which may be welded or otherwise suitably secured to the end of the drum. The drum end wall is formed with a central opening therethrough registering with the opening in the bearing sleeve, as shown.

The driving element of the coupling is formed by a tubular hub 15 adapted to fit on a driving shaft 16, such as an electric motor shaft, or an extension of the crank shaft of an internal combustion engine. The hub has a relatively large outer portion to fit rotatably in the sleeve 13 and inward movement of the hub into the sleeve may be limited by snap rings, shown at 17. Within the drum 10 the hub has a reduced extension 18 terminating near the end of the shaft 16 and which may be secured on the shaft by a nut 19.

The hub carries a driving plate indicated generally at 21 which is keyed to the hub within the drum and adjacent the end thereof, as best shown in Figure 1. The plate 21 extends radially outward a short distance from the hub and then bends axially, as shown at 22, substantially to the axial center of the drum and then again radially outward, as shown at 23. The ends 23 of the plate are formed with radially extending notches 24 cut centrally into the ends of the plate to leave lugs 25 at opposite sides of the notches terminating equi-distant from the hub axis. The lugs 25 may receive bearing sleeves 25' formed of a tough plastic or the like to take up wear and which can easily be replaced if necessary.

Figure 2:
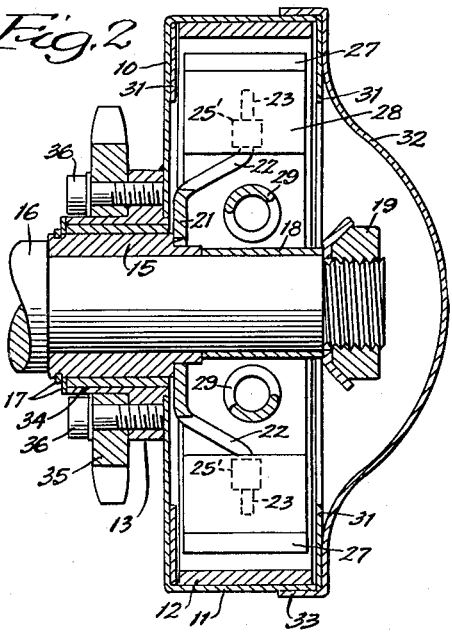
Figure 2 is a central axial section of the coupling of Figure 1.

The hub is adapted to be connected to the drum through a pair of arcuate friction elements including arcuate sheet metal strips 26, each substantially semicircular, carrying a friction lining material 27 on their outer surfaces. The end portions of the friction bands 26 overlie the lugs 25, as shown, and are formed at their extreme ends with inwardly extending driving projections 27 which extend loosely into the notches 24. The friction bands are urged away from the drum by means of tension springs 29 which are secured to the bands at opposite sides of their centers and which extend between the bands at right angles to a lining connecting the notches. As best seen in Figure 2, adequate space for the springs is provided within the offset portions 22 of the plate 21.

In operation, when the shaft 16 is turning centrifugal force on the friction bands 26 will tend to move them outward into engagement with the drum friction surface 12. If the speed is insufficient to overcome the tension of the springs 29 the clutch will remain in its disengaged position, as shown, in which the friction surfaces 12 and 27 clear each other so that there will be no friction drag. In this position, the springs hold the friction bands seated against the outer ends of lugs 25 so that the friction bands are accurately centered and uniform clearance between the bands and the drum is maintained.

As the speed increases, the bands will be thrown out by centrifugal force against the springs 29 to engage the friction surface 12 and to tend to turn the driven drum 10. It will be noted at this time, regardless of the direction of rotation of the shaft, that each band will be driven from its leading end so that the torque transmitted to the drum will be substantially independent of the coefficient of friction between the bands and the drum, as is known in the art. The driving force will, however, increase with speed and when it becomes sufficient to turn the driven drum rotation of the shaft will be transmitted to the driven drum to drive a desired load. The speed characteristics of the coupling may easily be changed by substituting stronger or weaker springs at 29 or varying pre-loading of the springs 29 so that the friction bands will move out at the desired speed. This can easily be accomplished and by this means a single relatively simple design can be made to serve the demands of a number of widely varying different types of service. The friction bands are preferably guided and held centered in the drum by anti-friction plates 31 mounted in the drum at opposite sides of the bands. The entire unit is preferably enclosed by a dished cover plate 32 having an edge flange 33 fitting over the open end of the drum and held in place either by friction or by small spring detents, as is well known in the art. With the cover plate in place, the unit is completely enclosed so that the parts are protected from dirt, moisture, or other foreign material.

The load to be driven may be connected to the drum 10 in any one of a desired number of ways through different types of drive elements secured to the bearing sleeve 13. For this purpose the bearing sleeve is preferably formed with a reduced outer end 34 onto which the driving elements may fit. As shown in Figure 2, the bearing sleeve carries a sprocket gear 35 bored at its center to fit over the reduced end 34 of the bearing sleeve. The sprocket gear has a relatively narrow web which butts against a shoulder joining the reduced end 34 to the inner end of the bearing sleeve and may be secured to the bearing sleeve by fastenings, such as screws 36. When so mounted, adequate clearance is provided around the sprocket gear for the chain to fit thereon and the clutch 16 may drive the load through the chain and the coupling.

Figure 3:
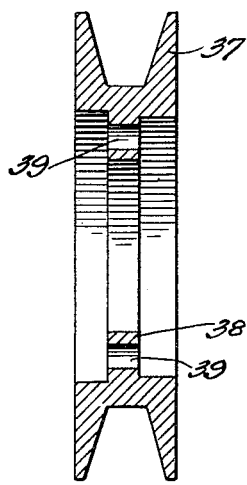
Figures 3 and 4 are axial sections of alternative driving elements which may be used with the coupling.

Instead of employing a sprocket gear, as shown in Figure 2, a pulley, as shown in Figure 3, may be mounted on the bearing sleeve. The pulley comprises an outer pulley portion 37 to receive a conventional driving belt and is formed with an internal reduced web 38 to fit over the reduced end 34 of the bearing sleeve and to rest against the shouldered portion of the bearing sleeve in the same manner as the sprocket gear 35. The web 38 may be formed with openings 39 to receive fastenings, such as the screws 36. When the pulley is mounted, the outer belt receiving portion thereof preferably lies closely adjacent to the end of the drum 10 so that space requirements are minimized.

Figure 4:
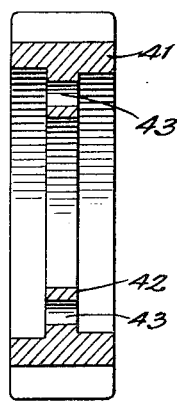

When a gear drive is desired a gear, as shown in Figure 4, may be mounted on the bearing sleeve. This gear, as illustrated, includes an outer toothed rim portion 41 having an inwardly extending annular flange 42 formed with a series of openings 43 to receive fastenings. The gear may be mounted in the same manner as the pulley of Figure 3 and will fit relatively closely against the end of the drum to minimize space requirements.

While several embodiments of the invention have been shown and described in detail, it will be understood that they are for the purpose of illustration only, and are not to be taken as a definition of the scope of the invention, reference being had for this purpose, to the appended claims.

What is claimed is:

1. A torque transmitting coupling comprising a drum having an internal annular friction surface, a driving hub extending axially into the drum, means carried by the hub forming a pair of diametrically spaced notches each defined by a pair of circumferentially spaced lugs, said means being spaced from the hub centrally of the axial length of the drum to leave open spaces adjacent to the hub, a pair of arcuate friction bands lying in radial registry around the hub with the end portions of each band overlying lugs for the different notches respectively, inwardly extending driving projections on the ends of the bands extending loosely into the notches respectively, and resilient tension means connecting the bands and extending through the open spaces adjacent to the hub to urge the bands radially inward to a position with their end portions resting on and centered by the lugs.

2. A torque transmitting coupling comprising a drum having an internal annular friction surface, a driving hub extending axially into the drum, means carried by the hub forming a pair of diametrically spaced notches each defined by a pair of circumferentially spaced lugs, said means being spaced from the hub centrally of the axial length of the drum to leave open spaces adjacent to the hub, a pair of arcuate friction bands lying in radial registry around the hub with the end portions of each band overlying lugs for the different notches respectively, inwardly extending driving projections on the ends of the bands extending loosely into the notches respectively, and a pair of parallel tension springs connected to the bands and extending through the open spaces adjacent to the hub at right angles to a line between the notches to urge the bands radially inward.

3. A torque transmitting coupling comprising a drum having an internal annular friction surface, a driving hub extending axially into the drum, a driving plate secured to the hub adjacent to one end of the drum and axially offset so that its ends lie substantially centrally of the drum, the ends of the plate being notched, a pair of semi-circular friction bands fitting in the drum with their ends lying over the notches, inwardly extending driving projections on the ends of the bands, one driving projection on each band fitting loosely into each notch, and tension springs connecting the bands and extending adjacent to the hub in lines perpendicular to a line connecting the notches and lying within the offset portions of the driving plate.

References Cited in the file of this patent

UNITED STATES PATENTS

| | | |
|---|---|---|
| 521,160 | Geiger | June 12, 1895 |
| 994,379 | Faile | June 6, 1911 |
| 1,703,694 | Rushton | Feb. 26, 1929 |
| 2,504,177 | Bruestle | Apr. 18, 1950 |